United States Patent
Leko et al.

(10) Patent No.: US 10,920,831 B2
(45) Date of Patent: Feb. 16, 2021

(54) PROPSHAFT ASSEMBLY HAVING YOKE FRICTION WELDED TO PROPSHAFT TUBE

(71) Applicant: American Axle & Manufacturing, Inc., Detroit, MI (US)

(72) Inventors: Michael J. Leko, Traverse City, MI (US); Lance M. Kujawski, Clinton Township, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 433 days.

(21) Appl. No.: 15/904,461

(22) Filed: Feb. 26, 2018

(65) Prior Publication Data

US 2018/0180103 A1 Jun. 28, 2018

Related U.S. Application Data

(62) Division of application No. 15/159,119, filed on May 19, 2016, now Pat. No. 9,933,020.

(Continued)

(51) Int. Cl.
*F16D 3/38* (2006.01)
*F16C 3/02* (2006.01)
(Continued)

(52) U.S. Cl.
CPC ............ *F16D 3/387* (2013.01); *B23K 20/129* (2013.01); *F16C 3/023* (2013.01);
(Continued)

(58) Field of Classification Search
CPC .... F16D 3/387; F16D 2250/0076; F16D 3/41; F16C 3/023; F16C 2226/52;
(Continued)

(56) References Cited

U.S. PATENT DOCUMENTS 1,368,490 A * 2/1921 Dieckmann ............ B23K 11/14
403/271
1,488,128 A * 3/1924 MacDonald .............. F16B 7/02
403/271

(Continued)

FOREIGN PATENT DOCUMENTS

CN 1651776 A 8/2005
CN 201618915 U 11/2010
(Continued)

OTHER PUBLICATIONS

Chapter 10; Assembly Techniques; Category II; Welding, Adhesive Bonding.
(Continued)

*Primary Examiner* — Greg Binda
(74) *Attorney, Agent, or Firm* — Burris Law, PLLC

(57) ABSTRACT

A propshaft assembly that includes a propshaft tube and a weld yoke. The propshaft tube has a wall member. The weld yoke has a yoke body with an annular outer surface and an annular inner surface. The propshaft tube is welded to the yoke body such that a portion of the propshaft tube is disposed radially between the annular outer and inner surfaces and embedded into an axial end of the yoke body.

13 Claims, 4 Drawing Sheets

Related U.S. Application Data

(60) Provisional application No. 62/165,387, filed on May 22, 2015.

(51) Int. Cl.
  *B23K 20/12* (2006.01)
  *B23K 101/00* (2006.01)

(52) U.S. Cl.
  CPC .... *B23K 2101/005* (2018.08); *F16C 2226/52* (2013.01); *Y10T 403/478* (2015.01)

(58) Field of Classification Search
  CPC .............. F16C 2226/36; B23K 20/129; B23K 2101/005; Y10T 403/478
  USPC .................................................. 464/134, 182
  See application file for complete search history.

(56) References Cited

U.S. PATENT DOCUMENTS

| | | | |
|---|---|---|---|
| 2,952,999 | A | 9/1960 | Glover |
| 3,269,002 | A | 8/1966 | Hollander et al. |
| 3,618,196 | A | 11/1971 | Sluetz |
| 4,211,589 | A * | 7/1980 | Fisher ..................... F16O 3/026 464/182 |
| 4,663,819 | A | 5/1987 | Traylor |
| 5,154,340 | A | 10/1992 | Peacock |
| 5,672,286 | A | 9/1997 | Seeds |
| 6,105,849 | A | 8/2000 | Mochizuki et al. |
| 6,199,916 | B1 | 3/2001 | Klinger et al. |
| 6,817,511 | B2 | 11/2004 | Durand |
| 7,168,608 | B2 | 1/2007 | Mei |
| 10,400,826 | B2 * | 9/2019 | Leko ....................... F16D 3/387 |
| 2006/0121994 | A1 | 6/2006 | Douglass et al. |
| 2006/0131300 | A1 | 6/2006 | Yablochnikov |
| 2008/0023527 | A1 | 1/2008 | Brenninger et al. |
| 2011/0300954 | A1 | 12/2011 | Szuba et al. |
| 2014/0302961 | A1 | 10/2014 | Downs et al. |
| 2014/0339888 | A1 | 11/2014 | Downs et al. |
| 2015/0345540 | A1 | 12/2015 | Kim |
| 2019/0085891 | A1 * | 3/2019 | Kamikawa ............. B29O 65/48 |

FOREIGN PATENT DOCUMENTS

| | | |
|---|---|---|
| CN | 103537791 A | 1/2014 |
| JP | 2004308751 A | 11/2004 |
| JP | 2014-161881 A | 9/2014 |
| WO | WO-2014/109592 A1 | 7/2014 |

OTHER PUBLICATIONS

International Search Report and Written Opinion of the International Searching Authority regarding International Application No. PCT/US2016/033504, dated Sep. 1, 2016.

Brazilian Office Action dated Jul. 7, 2020 for corresponding Brazilian application 1120170241447, filed Nov. 9, 2017.

* cited by examiner

PROPSHAFT ASSEMBLY HAVING YOKE FRICTION WELDED TO PROPSHAFT TUBE

CROSS-REFERENCE TO RELATED APPLICATIONS

This application is a division of U.S. application Ser. No. 15/159,119 filed May 19, 2016, now U.S. Pat. No. 9,933,020, which claims the benefit of U.S. Provisional Patent Application No. 62/165,387 filed May 22, 2015. The disclosure of each of the above-referenced applications is incorporated by reference as if fully set forth in detail herein.

FIELD

The present disclosure relates to a propshaft assembly having a yoke that is friction welded to a propshaft tube.

BACKGROUND

This section provides background information related to the present disclosure which is not necessarily prior art.

Propshaft assemblies for cars and trucks typically are employed to transmit rotary power from an input device, such as a transmission or a transfer case, to an output device, such as an axle assembly. Commercial propshaft assemblies typically comprise a propshaft tube that is welded on one or more ends to a weld yoke. A common welding process for coupling the weld yoke(s) to the propshaft tube is friction welding. We have noted that it can be challenging to achieve sufficient weld strength when using relatively thin-walled tubing for the propshaft tube.

SUMMARY

This section provides a general summary of the disclosure, and is not a comprehensive disclosure of its full scope or all of its features.

In one form, the present disclosure provides a method for forming a propshaft assembly. The method includes: providing a propshaft tube having an annular wall member and an axial end face; providing a weld yoke having yoke body and a pair of yoke arms that extend from the yoke body, the yoke body defining an annular groove having side walls and an end face, the side walls being spaced apart to receive the annular wall member; spinning at least one of the propshaft tube and the weld yoke while engaging the axial end face to the end face of the annular groove to plasticize a portion of the weld yoke and a portion of the propshaft tube; and driving the weld yoke and the propshaft tube together to fuse the plasticized portion of the weld yoke and the plasticized portion of the propshaft tube together and thereby form a friction weld; wherein the propshaft tube is fused to the weld yoke over portions of the weld yoke that correspond to the side walls and the end face.

In one form, prior to driving the weld yoke and the propshaft tube together, a weld length control member is positioned around a portion of the propshaft tube and a portion of the yoke body in a location where the friction weld is to be formed and wherein the weld length control member is configured to limit migration of plasticized material from the plasticized portion of the propshaft tube in a radially outward direction. Optionally, the weld length control member can be part of the weld yoke or can be a tool that is independent of the propshaft assembly.

In another form, the present disclosure provides a propshaft assembly that includes a propshaft tube and a weld yoke. The propshaft tube has a wall member. The weld yoke has a yoke body with an annular outer surface and an annular inner surface. The propshaft tube is welded to the yoke body such that a portion of the propshaft tube is disposed radially between the annular outer and inner surfaces and embedded into an axial end of the yoke body.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
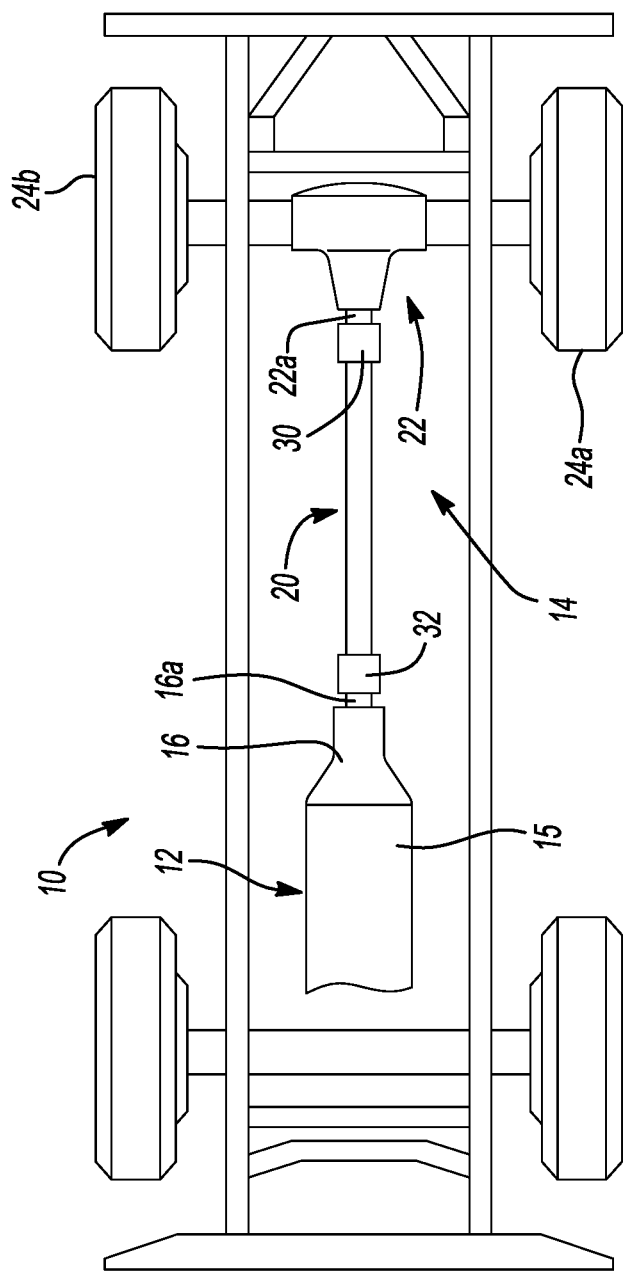
FIG. 1 is a schematic illustration of a propshaft assembly constructed in accordance with the teachings of the present disclosure, the propshaft assembly being illustrated in a drivetrain of an exemplary vehicle.

With reference to FIG. 1, a vehicle having a propshaft constructed in accordance with the teachings of the present disclosure is schematically illustrated. The vehicle 10 includes a power train 12 and a drivetrain 14. The power train 12 can include a power source, such as an internal combustion engine 15, and a transmission 16 that can cooperate to provide rotary power to the drivetrain 14. The drivetrain 14 can include a propshaft assembly 20 and an axle assembly 22 that cooperate to transmit rotary power to a pair of drive wheels 24a, 24b. The powertrain 12 and the axle assembly 22 can be conventional in their construction and operation and as such, a detailed discussion of these components need not be provided herein. The propshaft assembly 20 is configured to transmit rotary power between an output shaft 16a of the transmission 16 and an input pinion shaft 22a of the axle assembly 22.

Figure 2:
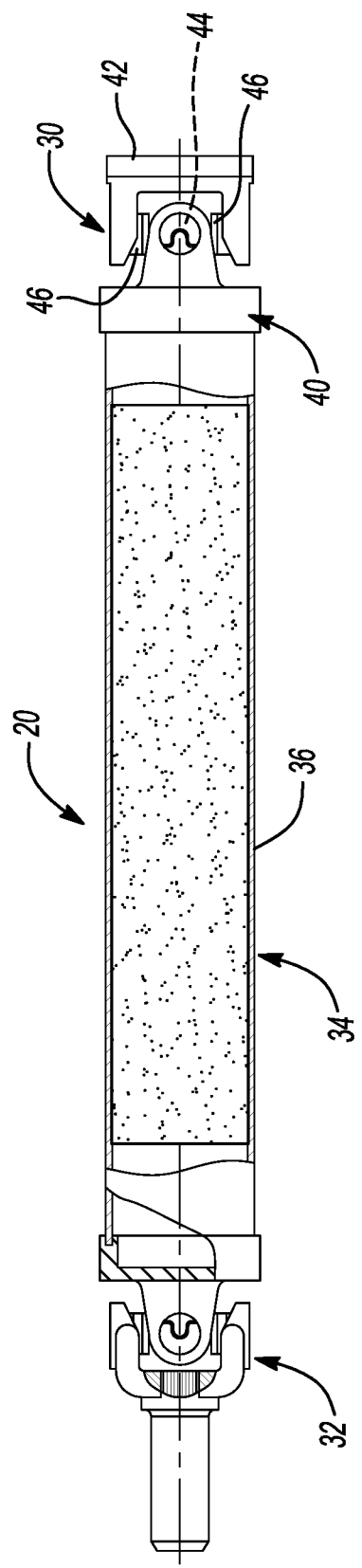
FIG. 2 is a partly sectioned side elevation view of the propshaft assembly of FIG. 1.

With reference to FIG. 2, the propshaft assembly 20 can include a first universal joint 30, a second universal joint 32 and a propshaft tube 34. The propshaft tube 34 can be formed of a desired material, such as 6XXX or 5XXX aluminum alloys (e.g., 5454, 6061-T6) or steel. The propshaft tube 34 can be a seamless tubular structure (e.g., extrusion) or could be a welded tubular structure and can define an annular wall member 36.

Figure 3:
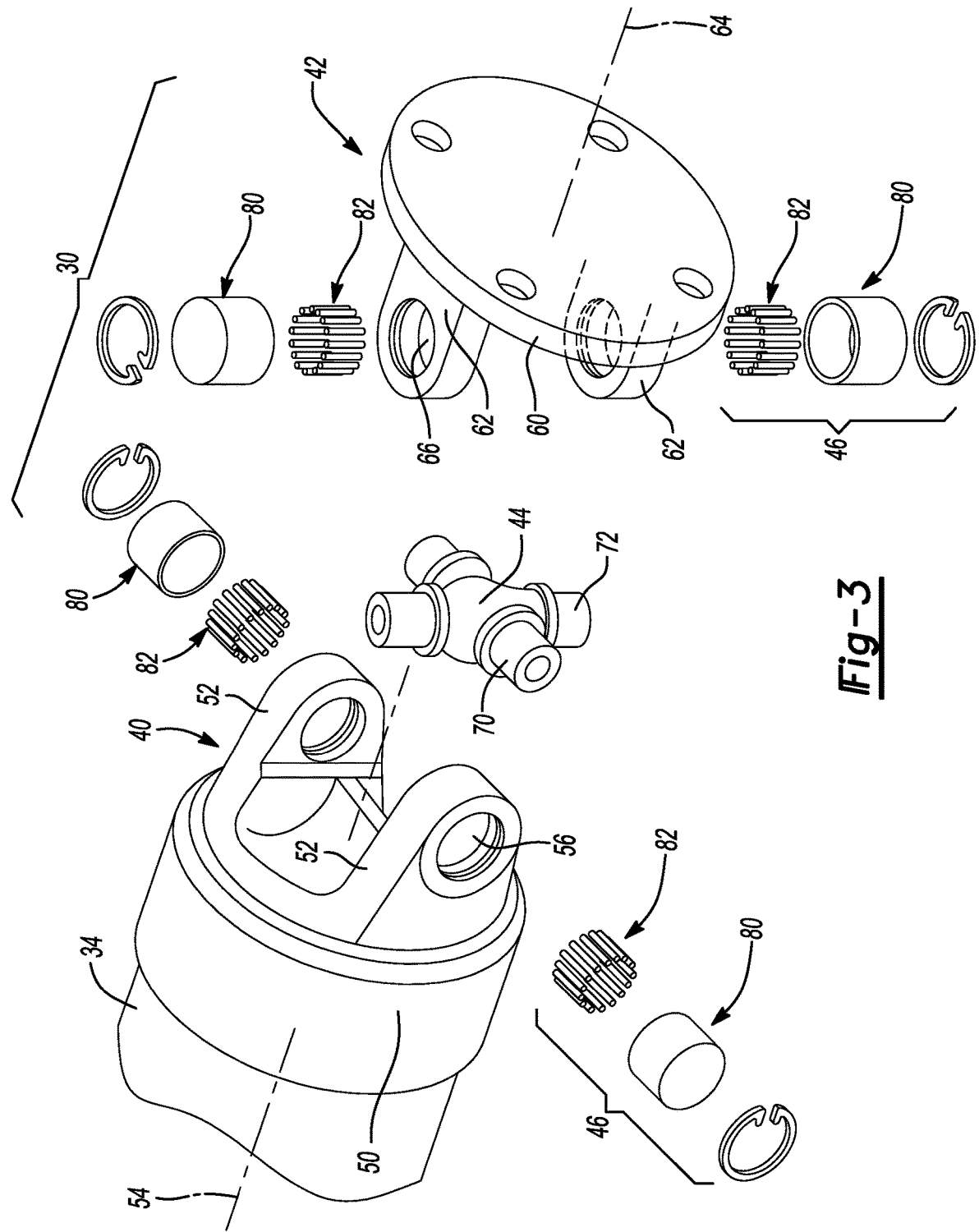
FIG. 3 is an exploded perspective view of a portion of the propshaft assembly of FIG. 1.

With reference to FIGS. 2 and 3, the first and second universal joints 30 and 32 are generally similar and as such a discussion of the first universal joint 30 will suffice for both. The first universal joint 30 can have a first yoke 40, a second yoke 42, a cross-shaft 44 and a plurality of bearing assemblies 46. The first yoke 40 can have a first yoke body 50 and a pair of first yoke arms 52 that extend from the first yoke body 50. The first yoke body 50 is configured to be fixedly coupled to the propshaft tube 34 via friction welding as will be discussed in greater detail below. The first yoke arms 52 are spaced 180 degrees apart from one another around a rotational axis 54 of the first yoke 40. Each of the first yoke arms 52 defines a bore 56 that is configured to receive an associated one of the bearings assemblies 46 therein.

The second yoke 42 can have a second yoke body 60 and a pair of second yoke arms 62 that extend from the second yoke body 60. The second yoke body 60 is configured to be axially and non-rotatably coupled to the input pinion shaft 22a (FIG. 1) in a desired manner, such as with a plurality of bolts (not shown). Alternatively, the second yoke body 60 could be configured as a slip yoke that could be configured to be non-rotatably but axially slidably coupled to a power transmitting element, for example in the manner shown for the second universal joint 32. The second yoke arms 62 are spaced 180 degrees apart from one another around a rotational axis 64 of the second yoke 42. Each of the second yoke arms 62 defines a bore 66 that is configured to receive an associated one of the bearing assemblies 46 therein.

The cross-shaft 44 defines a pair of first trunnions 70, which are received into the bores 56 in the first yoke arms 52, and a pair of second trunnions 72 that are received into the bores 66 of the second yoke arms 62. Each of the bearing assemblies 46 comprises a bearing cup 80, which is engaged to a corresponding one of the first and second yoke arms 52 and 62, and a plurality of rollers 82 that are disposed between the bearing cup 80 and a corresponding one of the first and second trunnions 70 and 72. Accordingly, it will be appreciated that each of the first trunnions 70 is pivotally mounted to a corresponding one of the first yoke arms 52 and that each of the second trunnions 72 is pivotally mounted to a corresponding one of the second yoke arms 62.

Figure 4:
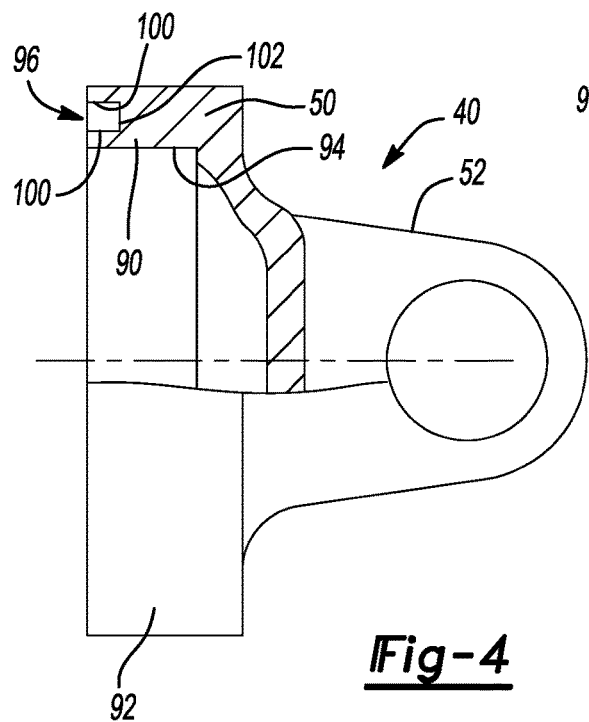
FIG. 4 is a partly sectioned side elevation view of a portion of the propshaft assembly of FIG. 1 illustrating a first yoke in more detail.
Figure 5:
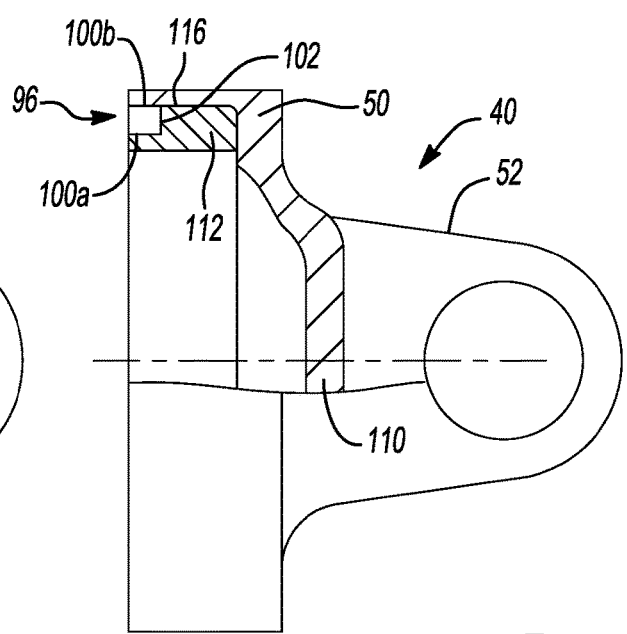
FIG. 5 is a view similar to that of FIG. 4 but illustrating an alternately constructed first yoke.

With reference to FIGS. 4 and 5, the first yoke 40 can be unitarily formed from a suitable material that is friction weld-compatible with the material from which the propshaft tube 34 (FIG. 2) is formed, such as 6061-T6 aluminum. The first yoke body 50 can have an annular wall 90 that can define an outer circumferential surface 92, an inner circumferential surface 94 and an annular groove 96 that is disposed between the outer and inner circumferential surfaces 92 and 94. The annular groove 96 can have a pair of sidewalls 100 and an end face 102. Alternatively, the first yoke 40 could be an assembly that can include a first yoke portion 110 and a second yoke portion 112. The first yoke portion 110 can define a bore 116 into which the second yoke portion 112 is fitted. The second yoke portion 112 can be fixedly coupled to the first yoke portion 110 by any desired means, such as welding. The second yoke portion 112 can at least partly define the annular groove 96. In the particular example provided, the second yoke portion 112 defines a first one of the sidewalls 100a and the end face 102, while the inside surface of the bore 116 in the first yoke portion 110 can define the remaining sidewall 100b.

Figure 6:
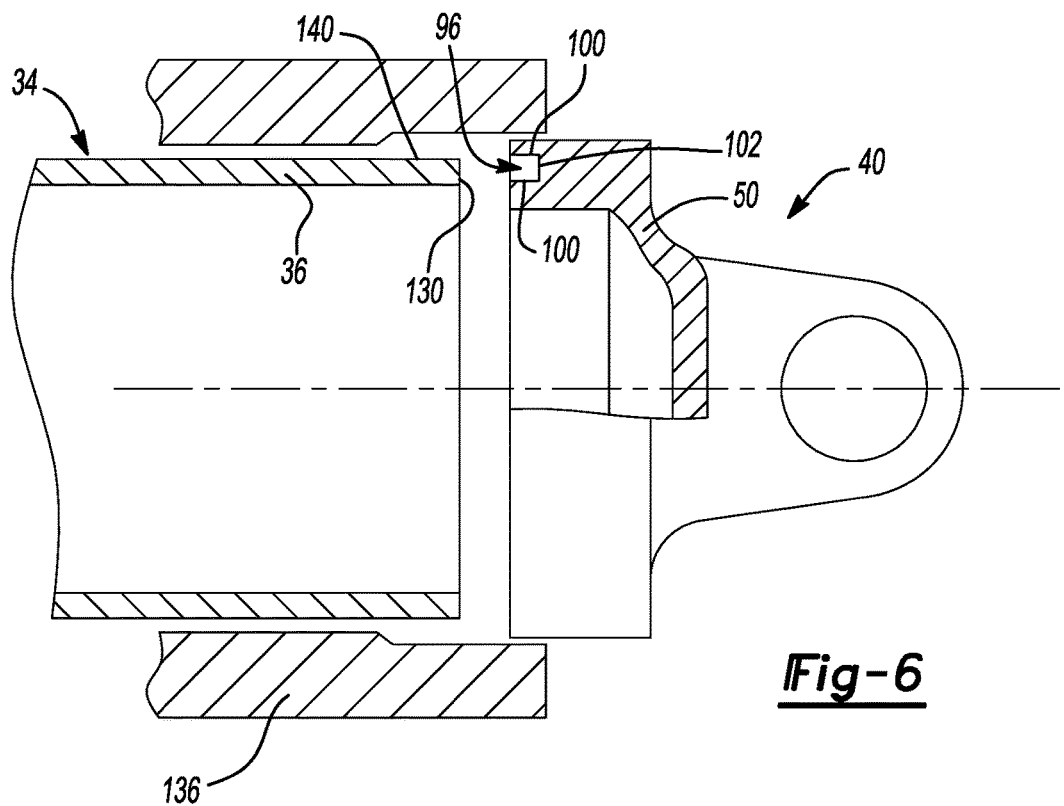
FIG. 6 is a partly sectioned side elevation view depicting the locating of the first yoke relative to a propshaft tube and a tool prior to the formation of a friction weld that secures the first yoke to the propshaft tube as part of the process for manufacturing the propshaft assembly of FIG. 1.

With reference to FIG. 6, the annular groove 96 can be sized to receive or partly receive the annular wall member 36 of the propshaft tube 34. In the particular example provided the annular groove 96 has a width (between the sidewalls 100) of about 0.050 inch (1.27 mm) and the annular wall member 36 has a thickness of about 0.075 inch (1.90 mm) to 0.120 inch (3.05 mm) so that there is an interference of about 0.025 inch (0.64 mm) to 0.070 inch (1.78 mm) between the propshaft tube 34 and the first yoke body 50. It will be appreciated, however, that the sidewalls 100 could be spaced apart by a distance that is sufficient to wholly admit the wall thickness of the propshaft tube 34. The annular groove 96 can have a desired depth, such as a depth of about 0.160 inch (4.0 mm). In practice, we have found that the wall thickness of the portion of the first yoke body 50 that is disposed between the outer circumferential surface of the first yoke body 50 and the outer one of the sidewalls 100 can be thicker than the wall thickness of the annular wall member 36 by a desired amount, such as by about twenty percent (20%). At least one of the propshaft tube 34 and the first yoke 40 can be spun while an axial face 130 of the annular wall member 36 is abutted to the end face 102 of the annular groove 96. Frictional contact between the axial face 130 and the end face 102 of the annular groove 96 can generate heat that can plasticize a portion of the first yoke body 50 and a portion of the propshaft tube 34. The first yoke 40 and the propshaft tube 34 can be driven together to fuse the first yoke 40 and the propshaft tube 34 together.

Figure 7:
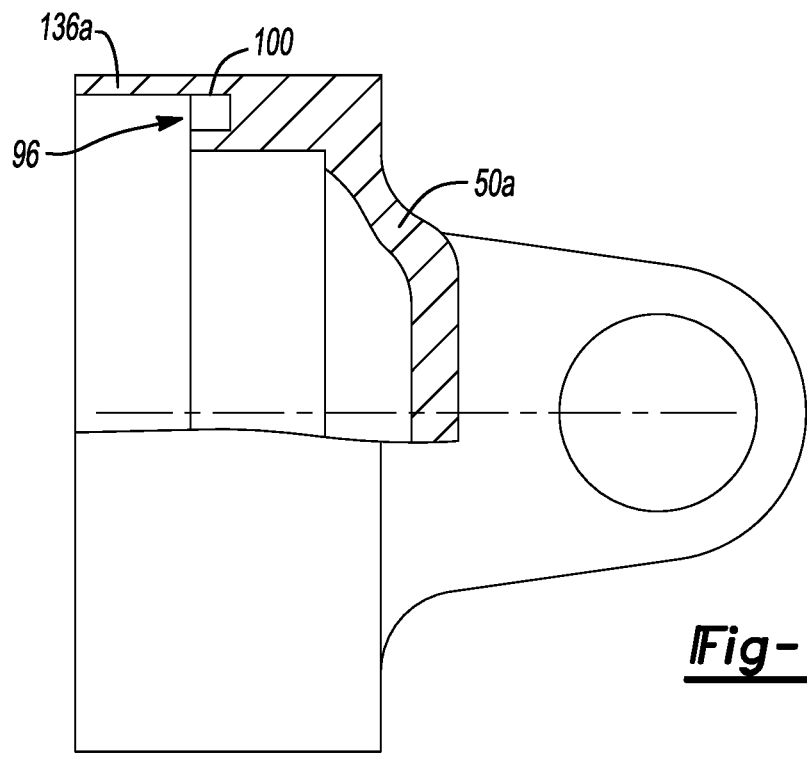
FIG. 7 is a view similar to that of FIG. 4 but illustrating yet another alternatively constructed first yoke.

If desired, a tool 136 can be employed during the friction welding process to limit the maximum diameter of the resulting weld (i.e., the tool 136 can function as a weld length control member). In the example provided, the tool 136 is configured to limit migration of the plasticized material of the first yoke body 50 in a radially outward direction by urging the plasticized material of the first yoke body 50 in an axial direction along the rotational axis 54 of the first yoke 40 to thereby extend a length of the resulting friction weld along the outer circumferential surface 140 of the propshaft tube 34. It should be appreciated, however, that the weld length control member 136a could be incorporated into the first yoke body 50a as shown in FIG. 7. In this example, the weld length control member 136a comprises an extension of the portion of the first yoke body 50a that defines the portion of the first yoke body 50a that defines the radially outer one of the sidewalls 100 of the annular groove 96.

Figure 8:
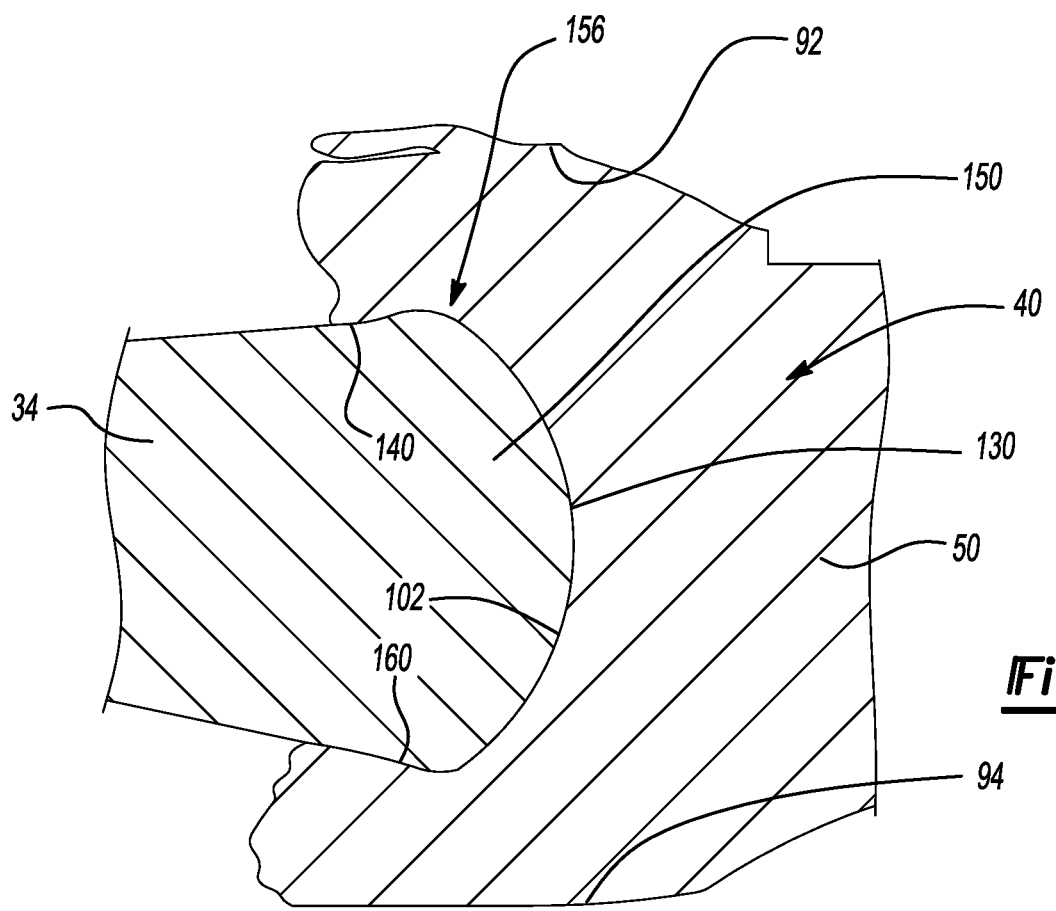
FIG. 8 is a section view of a portion of the propshaft assembly of FIG. 1 illustrating a weld zone that joins the first yoke to the propshaft tube.

In FIG. 8, a portion of the friction weld that fixedly couples the propshaft tube 34 to the first yoke 40 is illustrated. As shown, the propshaft tube 34 is welded to the first yoke body 50 such that a portion 150 of the propshaft tube 34 is disposed radially between the outer and inner circumferential surfaces 92 and 94 of the first yoke body 50 and the portion 150 of the propshaft tube 34 is embedded into an axial end of the first yoke body 50. In this regard, the friction weld defines a weld zone 156 having a radial component, in which the axial end face 130 of the propshaft tube 34 had abutted the end face 102 of the annular groove 96 in the first yoke body 50, as well as components that extend axially along the outer circumferential surface 140 and inner circumferential surface 160 of the propshaft tube 34. Configuration in this manner permits the weld zone 156 to be formed over a longer span as compared to the weld zone of a conventional friction weld, which would substantially conform to a cylindrical shape. Consequently, the weld zone 156 that is created with the present process can be significantly stronger than a conventional friction weld and can permit the wall thickness of the propshaft tube 34 to be decreased.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A propshaft assembly comprising:
 a propshaft tube, and
 a weld yoke,
 wherein the propshaft tube has a wall member,
 wherein the weld yoke has a yoke body and a pair of arms, the yoke body having a first and second axial ends, an annular outer surface and an annular inner surface, the pair of arms extending from the second axial end of the yoke body, and
 wherein the propshaft tube is welded to the yoke body such that a portion of the propshaft tube is disposed radially between the annular outer and inner surfaces and embedded into a surface on the first axial end of the yoke body.

2. The propshaft assembly of claim 1, wherein the propshaft tube has an inner circumferential surface and an outer circumferential surface, and wherein a portion of the weld yoke that is bonded to the propshaft tube surrounds both the inner circumferential surface and the outer circumferential surface of the propshaft tube at a location that is spaced apart from the surface on the first axial end of the yoke body.

3. The propshaft assembly of claim 1, wherein the propshaft tube is formed of aluminum.

4. The propshaft assembly of claim 1, wherein the propshaft tube is formed of steel.

5. The propshaft assembly of claim 1, wherein the propshaft tube is formed of seamless tubing.

6. The propshaft assembly of claim 1, wherein the propshaft tube is formed of welded tubing.

7. The propshaft assembly of claim 1, wherein the wall member of the propshaft tube has a thickness of about 0.075 inch to about 0.120 inch.

8. A propshaft assembly comprising:
 a propshaft tube, and
 a weld yoke,
 wherein the propshaft tube has a wall member with an inner circumferential surface and an outer circumferential surface,
 wherein the weld yoke has a yoke body with an annular outer surface, an annular inner surface and a circumferentially extending groove disposed in an axial end face of the weld yoke between the annular outer and inner surfaces, and
 wherein the propshaft tube is welded to the yoke body such that the portions of the annular outer and inner circumferential surfaces of the propshaft tube that are received in the circumferentially extending groove are bonded by the weld to the weld yoke.

9. The propshaft assembly of claim 8, wherein the propshaft tube is formed of aluminum.

10. The propshaft assembly of claim 8, wherein the propshaft tube is formed of steel.

11. The propshaft assembly of claim 8, wherein the propshaft tube is formed of seamless tubing.

12. The propshaft assembly of claim 8, wherein the propshaft tube is formed of welded tubing.

13. The propshaft assembly of claim 8, wherein the propshaft tube has a wall with a thickness of about 0.075 inch to about 0.120 inch.

* * * * *